United States Patent [19]

Rupp

[11] Patent Number: 5,353,019
[45] Date of Patent: Oct. 4, 1994

[54] PROCESS FOR MONITORING THE OUTPUT SIGNALS FROM A TRANSMITTING DEVICE

[75] Inventor: Jürgen Rupp, Erlangen, Fed. Rep. of Germany

[73] Assignee: Siemens Aktiengesellschaft, Munich, Fed. Rep. of Germany

[21] Appl. No.: 823,134

[22] Filed: Jan. 21, 1992

[30] Foreign Application Priority Data

Jan. 21, 1991 [DE] Fed. Rep. of Germany ....... 4101608

[51] Int. Cl.$^5$ ..................... G08B 29/00; G01R 25/00
[52] U.S. Cl. ..................... 340/870.05; 340/870.21; 324/76.82; 307/355; 328/29
[58] Field of Search ............. 340/870.25, 870.26, 340/870.05, 870.06, 870.09, 870.16, 870.21, 870.23; 324/76.39, 76.47, 76.48, 166, 76.55, 76.77, 76.82; 307/355, 356, 358, 314, 364; 328/28, 29, 265

[56] References Cited

U.S. PATENT DOCUMENTS

4,267,470  5/1981  Kawakami et al. ................. 307/515
4,990,767  2/1991  Ernst et al. ...................... 250/231.16

FOREIGN PATENT DOCUMENTS

3843108  2/1990  Fed. Rep. of Germany .

OTHER PUBLICATIONS

Machine Design, vol. 58, No. 4, Feb. 1986, Cleveland, US, pp. 93–98; Sidney A. Wingate: *Tracking Down Errors in Linear Encoders*.

*Primary Examiner*—John K. Peng
*Assistant Examiner*—Andrew Hill
*Attorney, Agent, or Firm*—Kenyon & Kenyon

[57] ABSTRACT

By rectifying, comparing and X-OR gating two signals (A,B) from a transmitting device (G) that are to be sinusoidal and have a corresponding rotational frequency, of the same amplitude, and ideally offset from one another electrically by 90°, a binary signal (RD) is generated that is indicative of whether a disturbance of the two signals (A,B) exists. A processing device (VE) determines if errors exist with respect to the amplitude, the offset or the phase relationship of the signals (A,B) by monitoring the mark-to-space ratio of the binary signal (RD) for its adherence to a ratio of 1:1, and generates a signal indicative of a disturbance when an error is determined to exist. Additionally, by dividing the binary signal (RD) via a 1:8 convertor (U) and monitoring that signal, the processing device can determine if a change in the rotational frequency of the two signals (A,B) of the transmitting device occurs.

12 Claims, 6 Drawing Sheets

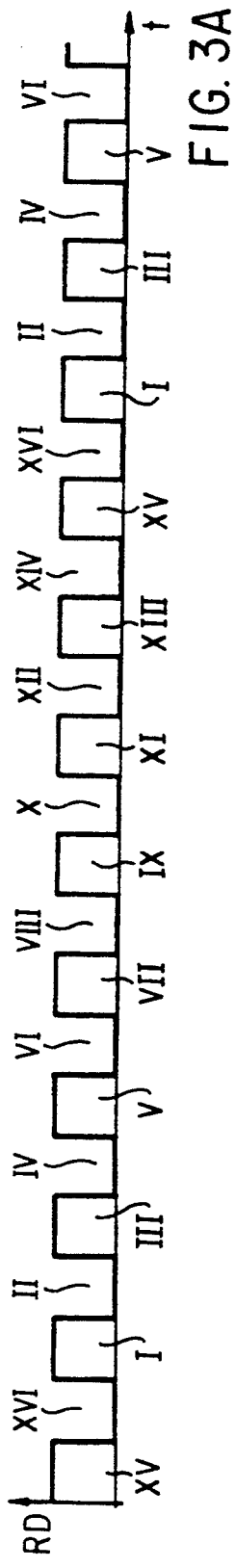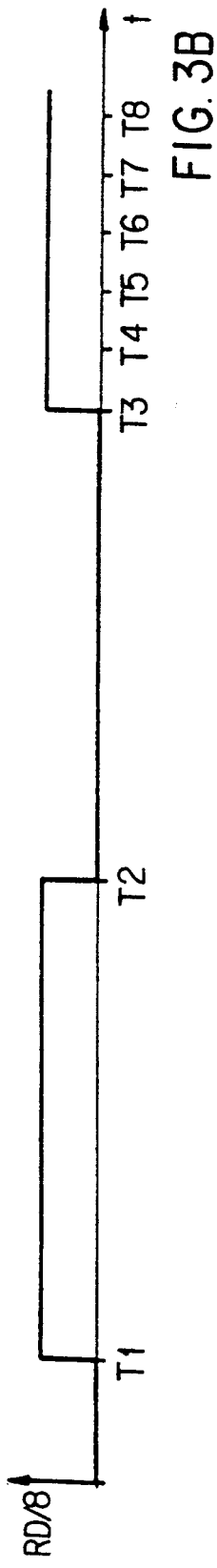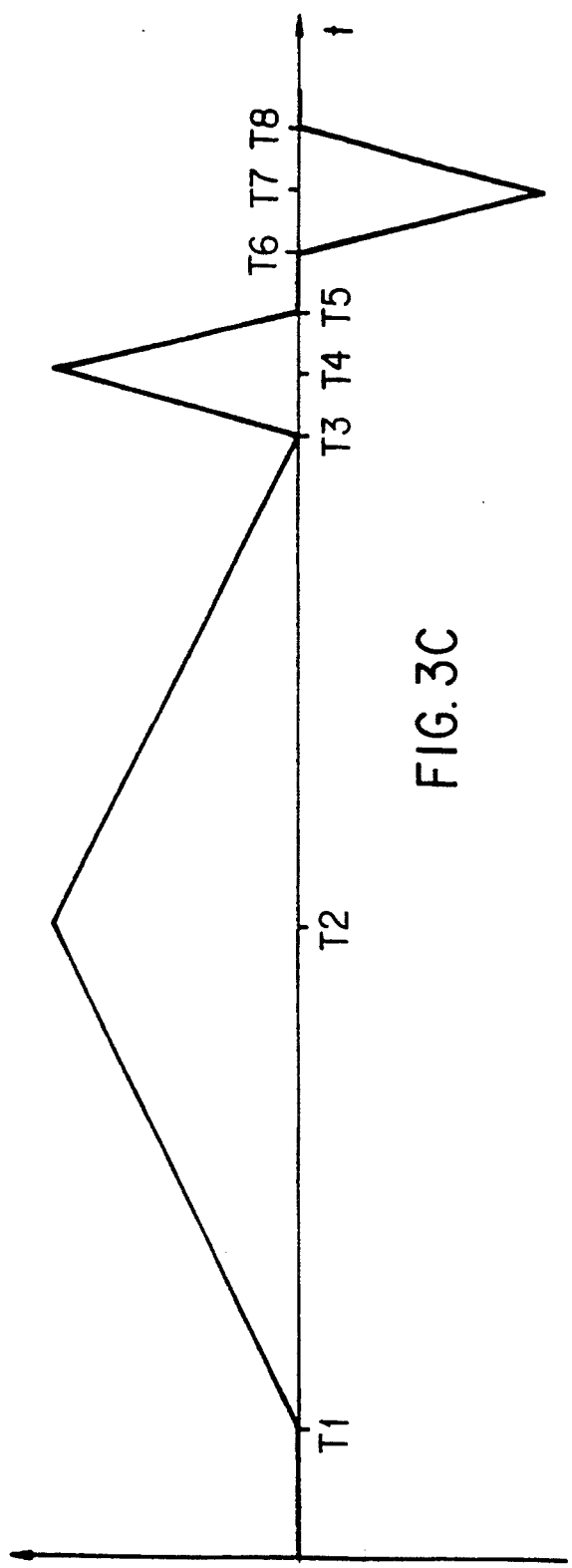

PROCESS FOR MONITORING THE OUTPUT SIGNALS FROM A TRANSMITTING DEVICE

BACKGROUND OF THE INVENTION

The present invention relates to a process for monitoring signals provided as outputs from a transmitting device. The signals include two sinusoidal, offset-free signals of the same amplitude. Ideally, it is preferred that the two signals have a phase difference of 90°.

Such processes are disclosed, for example, by the German Published Patent Application 38 43 108 and have been successfully carried out in the past. However, the expenditure for circuit engineering using such processes is considerable.

The present invention provides a process of the type mentioned at the outset. This process detects disturbances in the pattern (or waveform) of the output signals using a few simple process steps.

SUMMARY OF THE INVENTION

According to the present invention a process is provided in which:

a) each positive half-wave of a first signal transforms a first binary auxiliary signal into the logical "1" state;

b) each positive half-wave of a second signal transforms a second binary auxiliary signal into the logical "1" state;

c) the specific absolute values of the first and the second signals are compared to one another so that a third binary auxiliary signal is transformed into the logical "1" state when the absolute value of the first signal is greater than the absolute value of the second signal;

d) a fourth auxiliary signal is generated by providing the first and the second auxiliary signal to an exclusive-or gate (X-OR), ;

e) by X-OR gating the forth auxiliary signal and the third binary auxiliary signal, a first reference signal is generated; and f) the first reference signal has a mark-to-space ratio that is monitored for its adherence to the ratio 1:1, whereby any deviation of this ratio from 1:1, over a specifiable threshold value, releases a signal indicating a disturbance of the signals from the transmitting device. Amplitude, offset and phase errors are recognizable in principle using this process.

In the present invention a second reference signal is generated from the first reference signal through a 1:8 division. This second reference signal's mark-to-space ratio is also monitored for its adherence to the ratio 1:1. Any deviation from this 1:1 ratio, above a specifiable threshold value, releases a signal indicating that the first and second signals output from the transmitting device do not have a constant rotational frequency. This ensures that no unacceptable distortions of the first reference signal are produced during acceleration operations of the transmitting device.

The mark-to-space ratio of the second reference signal can be monitored quite easily from a circuit engineering standpoint. A counting device with an assigned constant clock frequency continues to increment from an initial setting during the pulse duration of the second reference signal, and correspondingly decrements during the pause time of the second signal. A deviation of the final counter content from the initial counter content represents a measure of the change in rotational frequency. Employing the mentioned counting device also allows a signal monitoring operation to be suspended during very low rotational frequencies, since when the prescribed counter content expected of the second counting device is exceeded, an unacceptably low rotational frequency of the transmitting device for monitoring purposes is indicated.

The adherenece to the mark-to-space ratio of 1:1 of the first reference signal is also realizable quite simply from a circuit engineering standpoint. A counting device is incremented from an initial setting with an assigned constant counting frequency during a first pulse duration of the first reference signal. Correspondingly, this counting device is decremented during the following pause time of the first reference signal. A deviation of the final counter content from the initial counter content indicates an amplitude or an offset error.

The present invention can also detect a third type of error, namely the phase error. During the following pulse pause of the first reference signal, the counting is again continued from the initial setting. The count is decremented during the following pause time. A deviation in the counter content from its initial setting indicates a phase error.

BRIEF DESCRIPTION OF THE DRAWINGS

Further details and advantages of the process according to the present invention are revealed in the detailed description, whereby reference is made to the figures.

FIGS. 2A–2H and FIGS. 3A–3C depict significant signal patterns during undisturbed or ideal operation.

DETAILED DESCRIPTION

Figure 1:
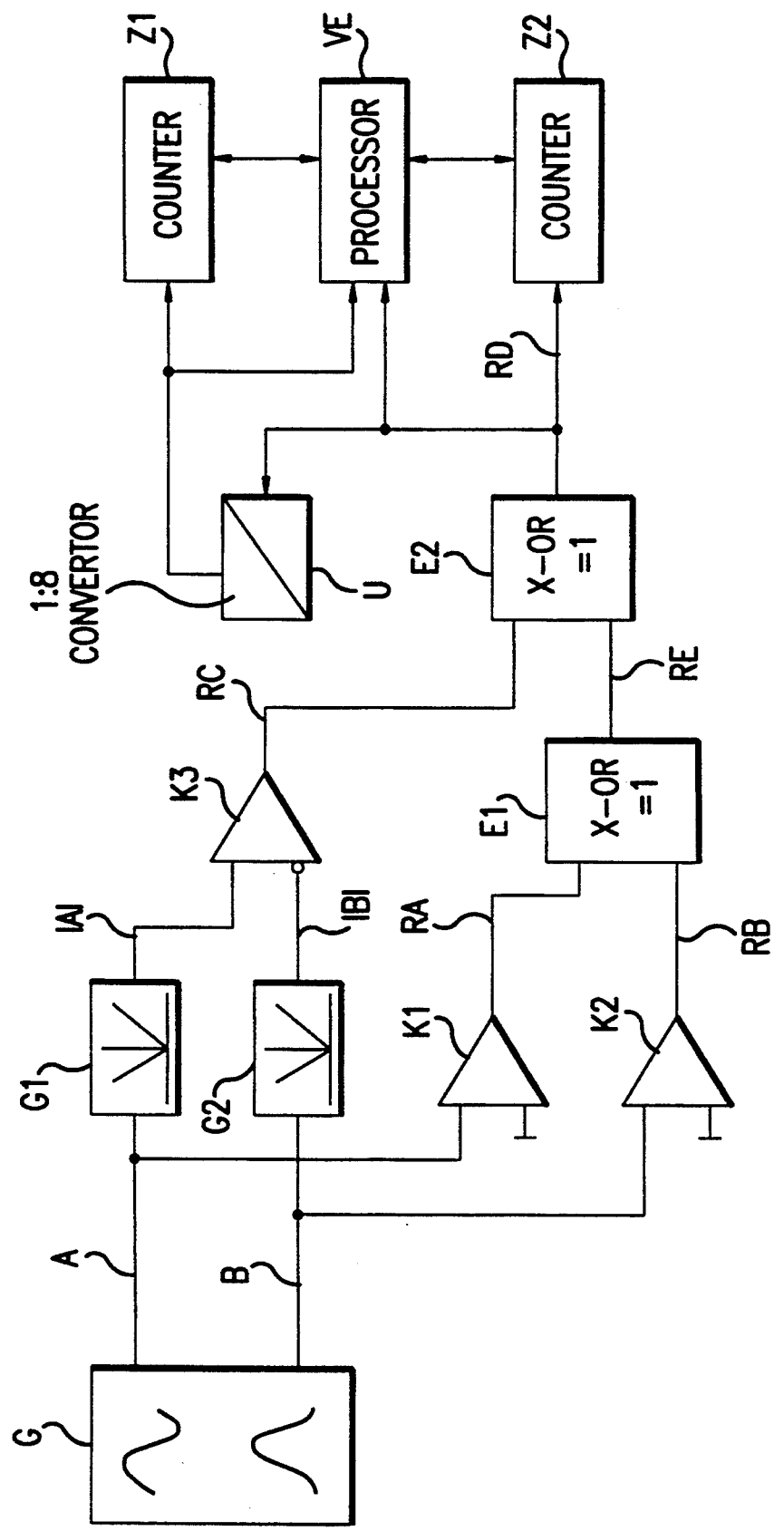
FIG. 1 shows a block diagram of a device for implementing the process of the present invention.

A device conceived for the process according to the present invention is depicted in FIG. 1 in block diagram form.

Two sinusoidal, offset-free signals of the same amplitude, are generated by a transmitting device G. These two signals are ideally offset from one another by 90°. The first signal is designated as signal A and the second signal as signal B. The first signal A is provided as an input to both a rectifier stage G1 and a comparator K1. The second signal B is provided as an input to both a rectifier stage G2 and a comparator K2. The second input terminals of the comparators K1 and K2 are each connected to a reference potential, V reference. The comparator K1 outputs a signal RA while the comparator K2 outputs a signal RB. Thus, with each positive half-wave of the first signal A, a first binary auxiliary signal RA exists in a logical "1" state at the output of the comparator K1. The first binary auxiliary signal RA assumes the logical "0" state at each negative half-wave of the first signal A. Similarly, with each positive half-wave of the second signal B, a second binary auxiliary signal RB exists in a logical "1" state, while in each negative half-wave of the second signal B the second binary auxiliary signal RB assumes the logical "0" state.

The signals A and B, rectified by the rectifier stages G1 and G2, are fed, as signals |A| and |B|, respectively, to a comparator K3. The comparator K3 outputs a third binary auxiliary signal RC which assumes a logical "1" state when the absolute value |A| of the first signal A is greater than the absolute value |B| of the second signal B.

By exclusive-or (X-OR) gating the first auxiliary signal RA and the second auxiliary signal RB via an X-OR element E1, a fourth auxiliary signal RE is generated. By X-OR gating the fourth auxiliary signal RE with the third auxiliary signal RC via a second EX-OR element E2, a reference signal RD is generated. When the transmitting device G, is operating properly this reference signal RD exhibits a mark-to-space ratio of 1:1. Four periods of the first reference signal RD are thereby generated per period of the transmitting device G.

A 1:8 division of the first reference signal RD is effected via converter U so that a second reference signal RD/8 is generated. This second reference signal RD/8 is provided as an input to both a counting device Z1 and a processing device VE. The processing device VE effectively controls the counting device Z1 and monitors the counting result of the counting device Z1 in a manner described below. Similarly, the first reference signal RD is provided as an input to both the processing device VE and a second counting device Z2 having a function explained in greater detail below.

Figure 2A:
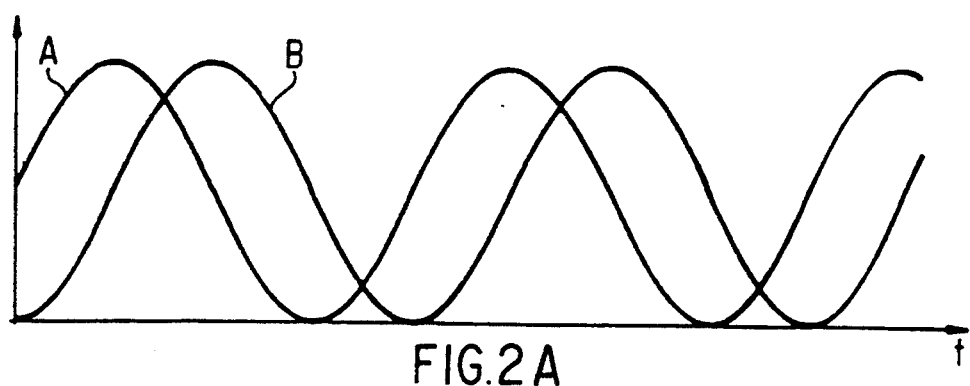

Eight temporally corresponding signal patterns are depicted in FIGS. 2A–2H. FIG. 2A shows the waveforms of the first and second signals A and B, respectively. In the assumed ideal state, the two signals have the same amplitude, are offset-free and have a phase difference with each other of 90°.

Figure 2B:
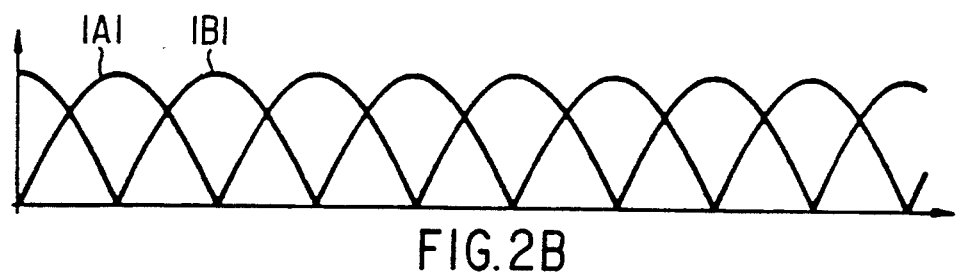

FIG. 2B shows the waveform of the output signals from the rectifier stage G1 and G2 (i.e., signals |A| and |B|).

Figure 2C:
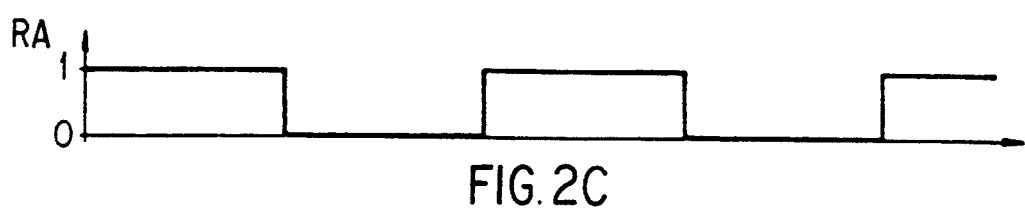

FIG. 2C depicts the waveform of the first auxiliary signal RA. Note that RA is a logical "1" when a positive half-wave of the first signal A exists. Otherwise RA is a logical "0".

Figure 2D:
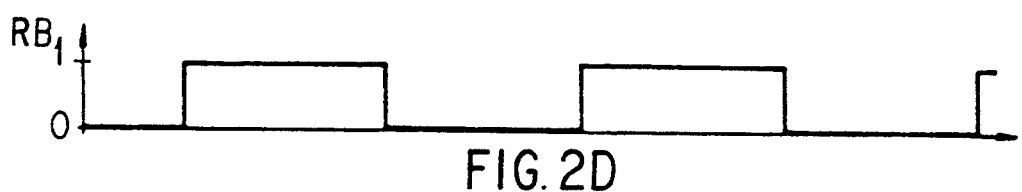

FIG. 2D depicts the waveform of the second auxiliary signal RB. Again, note that RB is a logical "1" when a positive half-wave of second signal B exists.

Figure 2E:
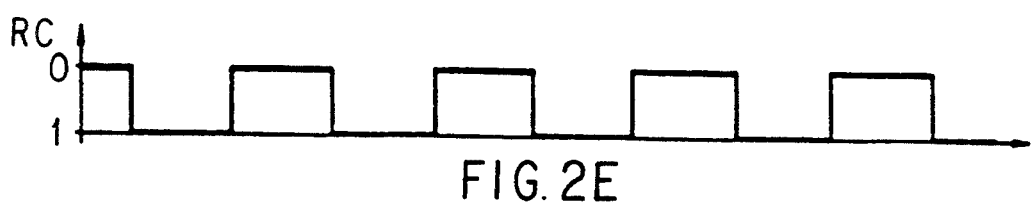

FIG. 2E shows the third auxiliary signal RC. RC always assumes a logical "1" state when the absolute value |A| of first signal A is greater than the absolute value |B| of second signal B. Otherwise a logical "0" signal exists.

Figure 2F:
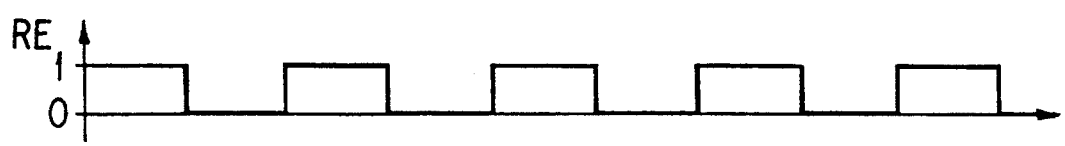

FIG. 2F shows the fourth auxiliary signal RE which results from X-OR gating the first auxiliary signal RA and the second auxiliary signal RB.

Figure 2G:
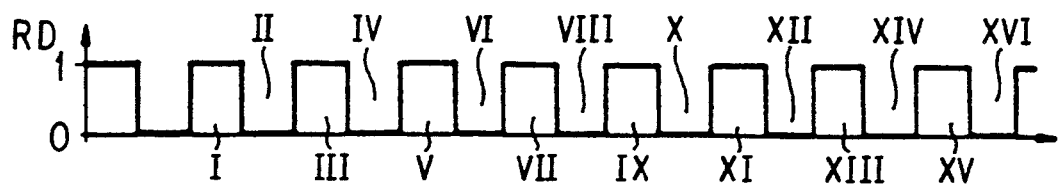
Figure 2H:
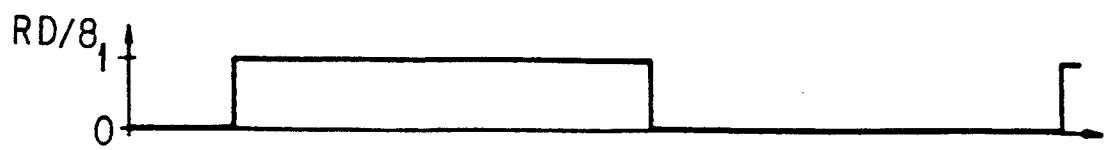

FIG. 2G shows the first reference signal RD which results from X-OR gating the fourth auxiliary signal RE and the third auxiliary signal RC. When the positive zero crossing of the second signal B is assumed as a starting instant of one cycle of the transmitting device G, the signal RD runs cyclically through eight periods, shown in FIG. 2F as pulses and pauses (marks and spaces) I through XVI. The mark-to-space ratio of the first reference signal RD is always 1:1 when the device is operating properly.

Further, as described below, when amplitude, offset, or phase errors exist, the mark-to-space ratio deviates from 1:1. However, even given such errors, the entire time span, from the beginning of pulse I to the end of pause VIII, is guaranteed to correspond exactly to the time period lasting from the beginning of pulse IX to the end of pause XVI because of the cyclical transmitter movement.

For this reason, the first reference signal RD is input to a 1:8 converter U which outputs the second reference signal RD/8. During the first above-mentioned time span (i.e., the time span from the beginning of pulse I to the end of pulse VIII), the signal RD/8 exhibits a logical "1" signal and during the second above-mentioned time span (i.e., the time span from the beginning of pulse IX to the end of pulse XVI), the signal RD/8 exhibits a logical "0" signal. Although the second reference signal RD/8 will possess a mark-to-space ratio of 1:1 even when the above described signal errors exist, this is true only when the transmitting device G is not in an acceleration or deceleration phase. It is important to dispense with signal analysis monitoring operations during such phases since dynamic influences could interfere with the signal analysis. Fortunately, the second reference signal RD/8 is now very well suited for determining whether the transmitting device G is in an acceleration or deceleration state. The mark-to-space ratio of the second reference signal RD/8 is distorted by acceleration or deceleration of the transmitting device G relative to a value of 1:1 (constant rotational frequency). Such a monitoring operation is explained with reference to FIGS. 3A–3C.

In FIGS. 3A and 3B, the first reference signal RD and the second reference signal RD/8 are depicted, corresponding temporally, while FIG. 3C shows the counter contents of the counter Z1 and counter Z2. The processing device VE initially starts a test routine at the beginning of a monitoring operation, if at all possible, with a positive signal edge of the second reference signal RD/8. The goal of the test routine is to determine whether the transmitting device G is in a state of constant rotational frequency. This is done by incrementing counter Z1 with a constant counting frequency as of an instant T1, as long as a logical "1" signal is applied during a pulse duration of the second reference signal RD/8. The counter Z1 is then decremented with the same counting frequency during the following pulse pause. As shown in FIG. 3A–3C, this pulse pause would last from the time T2 to the time T3. If there is a proper mark-to-space ratio of 1:1 of the second reference signal RD/8 at this point, the counter Z1 will have counted down again to its original setting (i.e., the count before the beginning of the counting operation) or will have at least reached the original setting within a specifiable tolerance band. According to the present invention, whether a stationary condition exists which permits, at all, the further signal monitoring operation is determined by the processing device VE at this point. Further, if the transmitting device G achieves a minimum rotational frequency (i.e., the counter Z1 does not exceed a specifiable counting threshold after the counting after the counting operations) further signal monitoring operation may be permitted.

The actual analysis of the signal quality with respect to amplitude-offset errors and phase errors initially takes place beginning at an instant T3 up to an instant T4, given by the end of a pulse duration I. During this time, the counter Z2 is incremented with a constant counting frequency. Counter Z2 is decremented in the same way during the pause II of the first reference signal RD (i.e., time beginning at instant T4 and ending at instant T5). Again, when a mark-to-space ratio of 1:1 exists (which indicates a correct operation), the counter Z2 must have nearly reached its original setting at the time T5.

There is no operation of the counter Z2 during a pulse III of the first reference signal RD (i.e., time beginning at instant T5 and ending at instant T6). Thus, at the beginning of a pause IV of the first reference signal RD, the second counter Z2 is activated again (and may this time, in the exemplified embodiment, count in the negative counting direction) incrementing until the time T7 and then decrementing again until the time T8 (i.e., until the end of the pulse duration IV of the first reference signal RD). As indicated, the counting direction of the counter Z2 permits different possible variations. However, it is significant that the integration of the counting operation is carried out over two periods of the first reference signal RD; specifically, one period first showing logical "1" and then logical "0", and another period, first showing logical "0" and then logical "1". If, at the end of at least one of the two periods, the counter content of the counter Z 2 is greater than a specifiable tolerance, then a signal quality error exists. This error is detected by the processing device VE.

Figure 4A:
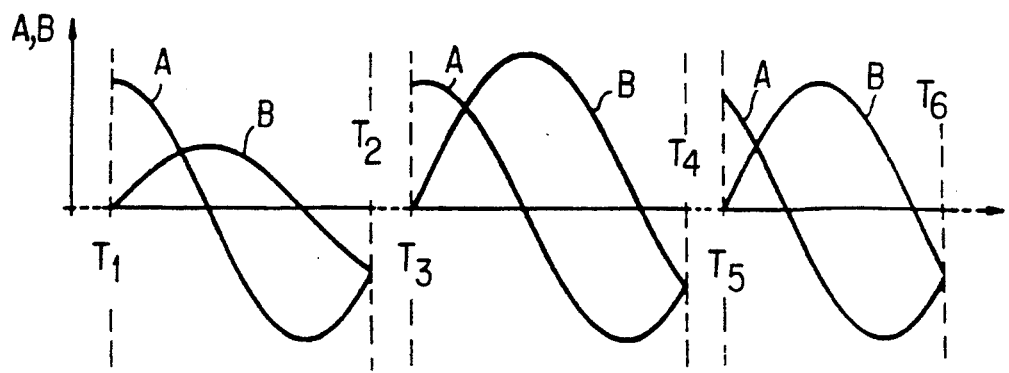
FIGS. 4A–4H depict significant signal patterns during disturbed or non-ideal operation.
Figure 4B:
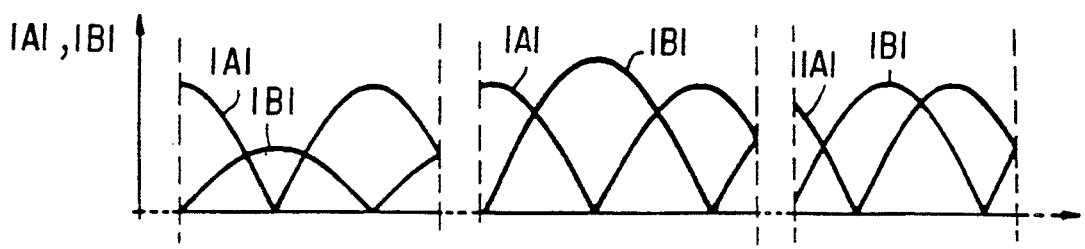
Figure 4C:
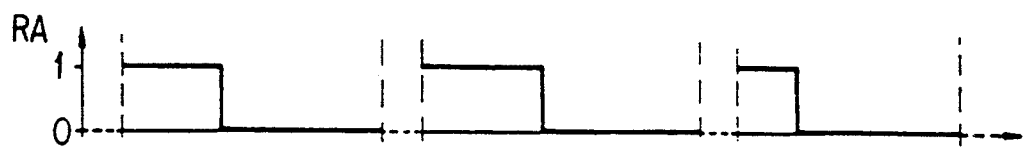
Figure 4D:
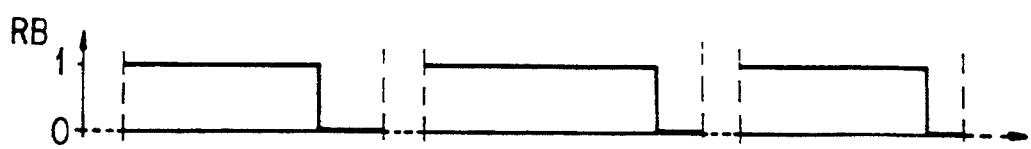
Figure 4E:
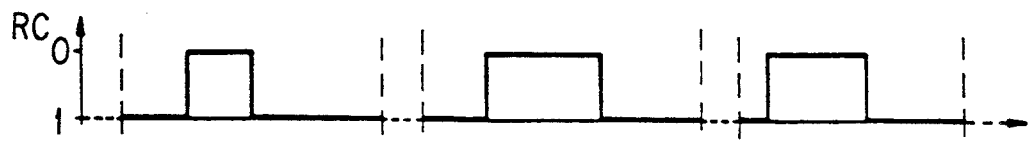
Figure 4F:
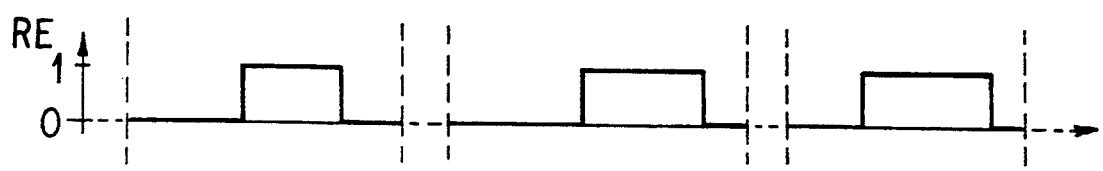
Figure 4G:
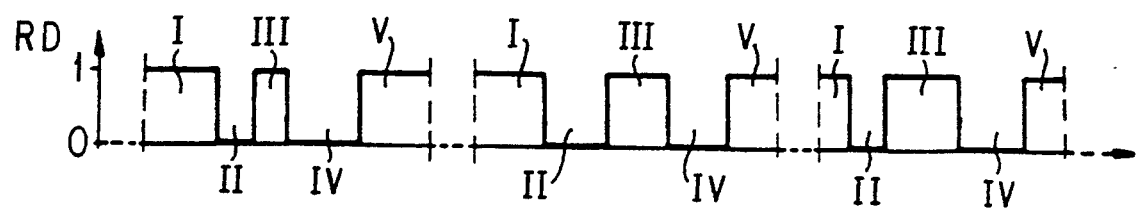

The representation according to FIGS. 4A–4H shows how the present invention operates in practice. Here, the significant signal patterns, as described at the outset and depicted in FIGS. 2A–2G, are depicted for: amplitude errors of the first and second signals A and B, respectively, during a period which may extend from one time $T_1$ up to a time $T_2$; an offset error of the transmitting device G from a time $T_3$ up to a time $T_4$; and a phase error from a time $T_5$ up to a time $T_6$. The time limits for the above three scenarios are indicated by dotted lines. FIG. 4B depicts the rectified signals $|A|$ and $|B|$, FIG. 4C depicts the first auxiliary signal RA, FIG. 4D depicts the second auxiliary signal RB, and FIG. 4E depicts the third auxiliary signal RC, and FIG. 4F depicts the fourth auxiliary signal RE.

Figure 4H:
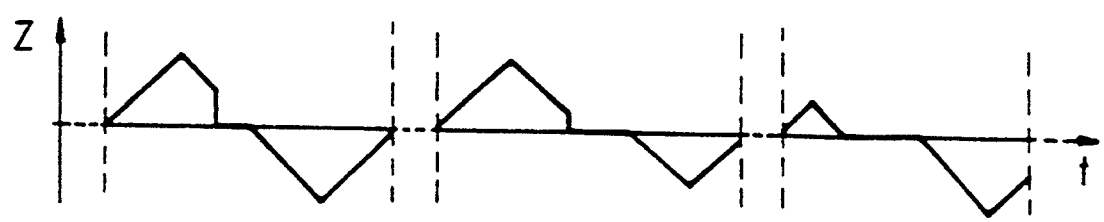

The waveform of the first reference signal RD is also important for the error recognition. When an amplitude error exists, the ratio of pulse duration I to pulse pause II deviates from 1, while the ratio from pulse pause IV to pulse duration V is still 1:1. This leads to the counter content variation characteristic as shown in FIG. 4H. This counter content variation characteristic is typical of errors.

An offset error also produces a corresponding deviation of the counter content of the counter Z2 after termination of a pulse pause II. However, a deviation of the counter content after the expiration of the pulse duration V also occurs.

A phase error is not detectable by the processing device VE immediately after the expiration of a pulse pause II. However, a phase error produces a counter content deviation of the counter Z2 after the expiration of a pulse duration V.

What is claimed is:

1. A process for monitoring a first and a second signal each output from a transmitting device, each being sinusoidal and having a corresponding rotational frequency, offset-free, of the same amplitude, and ideally having a phase difference of 90°, comprising the steps of:
    a) producing a first binary auxiliary signal with a logical "1" state with each positive half-wave of the first signal;
    b) producing a second binary auxiliary signal with the logical "1⇌" state with each positive half-wave of the second signal;
    c) comparing an absolute value of the first signal and an absolute value of the second signal, and producing a third binary auxiliary signal with the logical "1" state when the absolute value of the first signal is greater than the absolute value of the second signal;
    d) generating a fourth binary auxiliary signal by X-OR gating the first and the second binary auxiliary signal;
    e) generating a first reference signal by X-OR gating the fourth binary auxiliary signal and the third binary auxiliary signal; and
    f) monitoring the mark-to-space ratio of the first reference signal for its adherence to a ratio of 1:1, whereby any deviation from this ratio from 1:1 over a specifiable threshold value releases a signal which indicates a disturbance of the first and second signals from the transmitting device.

2. The process according to claim 1, further comprising the steps of
    generating a second reference signal from the first reference signal through a 1:8 division;
    monitoring the mark-to-space ratio of the second reference signal for its adherence to a ratio of 1:1, such that any deviation from this 1:1 ratio over and above a specifiable threshold value releases a signal indicating that the first and second signals output from the transmitting device do not have a constant rotational frequency.

3. The process according to claim 2, wherein a counting device with an assigned constant clock frequency continues to increment from an initial setting during a pulse duration of the second reference signal and correspondingly decrements during a pause time in this second reference signal, resulting in a final counter content such that, a deviation of the final counter content from the initial counter content represents a measure of change in rotational frequency.

4. The process according to claim 3, wherein when a prescribed counter content to be expected of the counting device is exceeded, the rotational frequency of the transmitting device is unacceptably low for monitoring purposes.

5. The process according to claim 1, wherein a first counting device is incremented from an initial setting with an assigned constant counting frequency during a first pulse duration of the first reference signal, and correspondingly the first counting device is decremented during a pause time following the first pulse duration, resulting in a final counter content, such that a deviation of the final counter content from the initial counter content indicates an amplitude or an offset error.

6. The process according to claim 5, wherein during a following pulse pause of the first reference signal the counting is again continued from the initial setting, the count is then decremented during the pulse time following said following pulse pause, such that a deviation in the counter content from its initial setting indicates a phase error.

7. A process for monitoring a first signal and a second signal, each output from a transmitting device, said first and second signals being substantially sinusoidal and having a corresponding rotational frequency, offset-free, of the same amplitude, and ideally offset from each other by a 90° phase difference comprising steps of:
    a) comparing each of said first and second signals with a reference voltage and producing a first binary auxiliary signal and a second auxiliary signal such that:
        said first binary auxiliary signal has a first binary state with each positive half-wave of the first signal and has a second binary state, said second binary state being the inverse of said first binary state, with each negative half-wave of the first signal; and said second binary auxiliary signal has said first binary state with each positive half-wave of the second signal and has said secondary binary state with each negative half-wave of the second signal;

b) rectifying each of the first and second signals, thereby producing an absolute value of the first signal and an absolute value of the second signal;

c) comparing said absolute value of the first signal and said absolute value of the second signal and producing a third binary auxiliary signal such that:

said third binary auxiliary signal has said first binary state when said absolute value of the first signal is greater than said absolute value of the second signal; and said third binary auxiliary signal has second binary state when said absolute value of the first signal is less than or equal to said absolute value of the second signal;

d) X-OR gating said first and second auxiliary binary signals, thereby generating a fourth binary auxiliary signal;

e) X-OR gating said fourth binary auxiliary signal and said third auxiliary binary signal thereby generating a first reference signal;

f) monitoring said first reference signal's mark-to-space ratio for its adherence to a ratio of 1:1;

g) generating a signal indicating a disturbance of the first and second signals when said mark-to-space ratio of said first reference signal deviates more than a specifiable threshold from the ratio of 1:1.

8. A process according to claim 7 for monitoring a rotational frequency of said transmitting device, further comprising steps of:

h) applying said first reference signal to a 1:8 converter, thereby generating a second reference signal;

i) monitoring the mark-to-space ratio of said second reference signal for its adherence to a ratio of 1:1, j) generating a signal indicating that the first and second signals output from the transmitting device do not have a constant rotational frequency when said mark-to-space ratio of said second reference signal deviates more than a specifiable threshold from the ratio of 1:1.

9. A process according to claim 7 for monitoring a rotational frequency of said transmitting device further comprising steps of:

h) applying said first reference signal to a 1:8 converter thereby generating a second reference signal, said second reference signal having a plurality of pulses and a plurality of pauses;

i) setting a counting device to an initial count setting, said counting device having an assigned constant clock frequency;

j) incrementing said counting device during a pulse period of said second reference signal;

k) decrementing said counting device during a pause period of said second reference signal immediately following said pulse period, thereby generating a final count of said counting device;

l) determining a difference between said initial count setting and said final count of said counting device;

m) generating a signal indicating a change in rotational frequency of the first and second signals output from the transmitting device based on said difference.

10. The process according to claim 9 further including the steps of:

n) comparing said difference with a preset value;

o) generating a signal indicating that the rotational frequency of the transmitting device is unacceptably low for monitoring purposes when said difference exceeds said preset value.

11. The process according to claim 7 wherein said first reference signal has a plurality of pulses and a plurality of pauses, further including steps of:

h) setting a first counting device to an initial count setting, said first counting device having an assigned constant clock frequency;

i) incrementing said first counting device during a first pulse period of said first reference signal;

j) decrementing said first counting device during a pause period of said first reference signal immediately following said first pulse period, thereby generating a final count of said first counting device;

k) determining the difference between said initial count setting and said final count of said first counting device;

l) generating a signal indicating an amplitude error or an offset error based on said difference.

12. The process according to claim 11 further including the steps of:

m) setting said first counting device to said initial count setting;

n) incrementing said first counting device during a next second pause period of said first reference signal;

o) decrementing said first counting device during a pulse period of said first reference signal immediately following said next second pause period thereby generating a second final count of said first counting device;

p) determining a second difference between said initial count setting and said second final count of said first counting device;

q) generating a signal indicating a phase error based on said second difference.

* * * * *